March 2, 1926.
J. JAKOBEY
CHRISTMAS TREE HOLDER
Filed Feb. 10, 1925
1,575,488
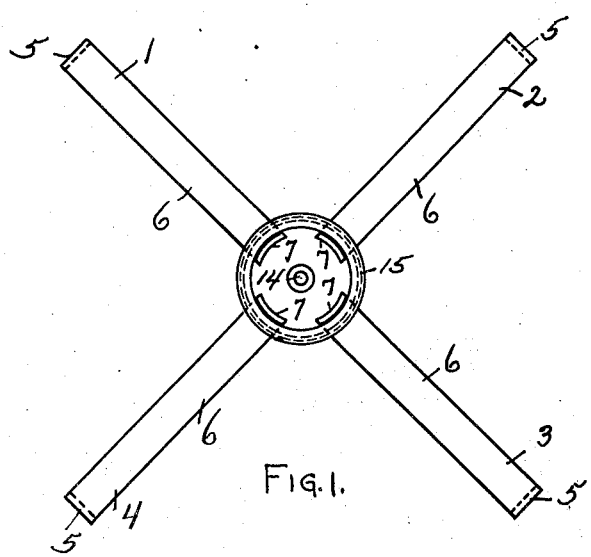
Fig. 1.
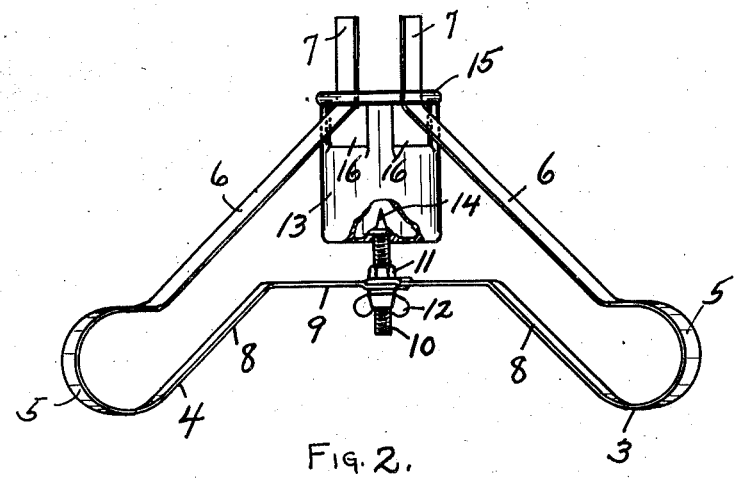
Fig. 2.
INVENTOR
BY
ATTORNEY.

Patented Mar. 2, 1926.

1,575,488

UNITED STATES PATENT OFFICE.

JOHN JAKOBEY, OF EAST YOUNGSTOWN, OHIO.

CHRISTMAS-TREE HOLDER.

Application filed February 10, 1925. Serial No. 8,127.

*To all whom it may concern:*

Be it known that JOHN JAKOBEY, citizen of the United States of America, residing at East Youngstown in the county of Mahoning and State of Ohio, has invented certain new and useful Improvements in Christmas-Tree Holders, of which the following is a specification.

This invention relates to Christmas tree holders, and more especially to a holder provided with a water cup for the base of the tree in an upright position.

With these and other objects in view, the invention consists of the combination and arrangements of parts which will be hereinafter more fully described and claimed:—

Figure 1 is a top plan of the device.

Figure 2 is a partial side elevation with portion cut away.

By referring to the drawings, it will be seen that I have provided a base portion consisting of feet 1, 2, 3, and 4. By referring to Figure 2, it will be seen that the feet 1 comprise curved spring members 5, provided with an inclined member 6, which in turn, is provided with tree holding arms 7. The feet 4 are provided with a lower inclined member 8, which are connected by horizontal members 9. Through the horizontal members 9, there is an adjusting bolt 10, provided with an adjusting nut 11 and a butterfly nut 12. The upper end of the adjusting bolt 10 is securely fastened to a water cup 13, and has sharp point 14 centrally located within the water cup 13. The water cup 13 is provided with an upper circular ring or flange 15. Immediately below the circular ring or flange 15, I have provided openings 16 for the reception of the tree holding arms 7. In using this device, the end of the tree to be held is placed within the water cup 13, and the end pressed down against the sharp point 14. Then the adjusting nut 11 is loosened and the butterfly nut 12 is turned up on the threads of the adjusting bolt 10, thereby, pulling the circular ring or flange 15 downwardly along the inclined members 6, thereby forcing the tree holding arms 7 firmly against the outer circumference of the tree to be held. The adjusting nut 11 is now turned down against the horizontal members 9. It is evident that the device may be easily folded when not in use by loosing the butterfly nut 12 and pressing the feet 1 and 4 together so that the corresponding feet 2 and 3 come together.

What I claim is:—

In a device of the class described, a support having four feet, four inclined members continuing therefrom and provided with four upturned tree holding arms, two horizontal members connecting the feet, an adjustable bolt passing through said horizontal members, a water cup secured to the upper end of said adjustable bolt, a sharp pointed element centrally located within said water cup, a plurality of openings in said cup for the reception of the inclined members, a circular ring or flange positioned at the top of said water cup and of said inclined members, means for adjusting the device and to allow for collapsing the same when not in use, substantially as described for the purpose set forth.

In testimony whereof I affix my signature.

JOHN JAKOBEY.